United States Patent
Kimura

(10) Patent No.: US 8,398,045 B2
(45) Date of Patent: Mar. 19, 2013

(54) SLIDE RAIL DEVICE FOR VEHICLE SEAT

(75) Inventor: Akihiro Kimura, Fujisawa (JP)

(73) Assignee: Shiroki Corporation, Kanagawa (JP)

( * ) Notice: Subject to any disclaimer, the term of this patent is extended or adjusted under 35 U.S.C. 154(b) by 0 days.

(21) Appl. No.: 13/410,724

(22) Filed: Mar. 2, 2012

(65) Prior Publication Data

US 2012/0160981 A1  Jun. 28, 2012

Related U.S. Application Data

(62) Division of application No. 13/316,679, filed on Dec. 12, 2011.

(30) Foreign Application Priority Data

Dec. 13, 2010 (JP) ................................. 2010-277512

(51) Int. Cl.
*F16M 13/00* (2006.01)
(52) U.S. Cl. ....................... 248/430; 248/429; 296/65.01
(58) Field of Classification Search .................. 248/429, 248/430, 424, 423; 296/64, 65, 1; 384/7
See application file for complete search history.

(56) References Cited

U.S. PATENT DOCUMENTS

| | | | |
|---|---|---|---|
| 4,422,612 A | 12/1983 | Frank | |
| 5,931,436 A * | 8/1999 | Rohee | 248/430 |
| 5,961,089 A * | 10/1999 | Soisnard | 248/430 |
| 5,984,254 A * | 11/1999 | Baloche et al. | 248/430 |
| 6,059,248 A * | 5/2000 | Bauer et al. | 248/430 |
| 6,427,962 B1 * | 8/2002 | Rohee et al. | 248/424 |
| 6,676,099 B2 * | 1/2004 | Mallard et al. | 248/429 |
| 6,874,746 B2 * | 4/2005 | Ganot | 248/430 |
| 7,931,246 B2 * | 4/2011 | Brewer et al. | 248/429 |
| 8,196,888 B2 * | 6/2012 | Yamada et al. | 248/429 |
| 8,215,602 B2 * | 7/2012 | Walter et al. | 248/424 |
| 8,251,336 B2 * | 8/2012 | Kimura et al. | 248/430 |
| 2009/0114793 A1 * | 5/2009 | Brewer et al. | 248/429 |
| 2010/0006733 A1 * | 1/2010 | Kimura et al. | 248/430 |
| 2011/0163217 A1 | 7/2011 | Kimura et al. | |
| 2012/0160982 A1 * | 6/2012 | Kimura | 248/430 |
| 2012/0205512 A1 * | 8/2012 | Fujishiro et al. | 248/429 |
| 2012/0256074 A1 * | 10/2012 | Garotte | 248/429 |

FOREIGN PATENT DOCUMENTS

| | | |
|---|---|---|
| JP | 58-426 A | 1/1983 |
| JP | 4-201636 A | 7/1992 |
| JP | 2009-227259 A | 10/2009 |

* cited by examiner

*Primary Examiner* — Anita M King
(74) *Attorney, Agent, or Firm* — Millen, White, Zelano & Branigan, P.C.

(57) ABSTRACT

A slide rail device which includes a lower rail, an upper rail which is freely slidably engaged with the lower rail, and balls which are installed between the lower and upper rails. The lower rail includes a lower-rail bottom wall, a pair of lower-rail side walls, a pair of lower-rail upper walls, a pair of lower-rail lower-ball contact R-portions, and a pair of lower-rail upper-ball contact R-portions. The upper rail includes an upper-rail top wall, a pair of upper-rail side walls, and a pair of upper-rail ball-bearing walls. Each upper-rail ball-bearing wall includes an upper-rail lower-ball contact portion and an upper-rail upper-ball contact portion. A radius of curvature of the lower-rail lower-ball contact R-portion of the lower rail is greater than that of the lower ball, and a radius of curvature of the lower-rail upper-ball contact R-portion of the lower rail is greater than that of the upper ball.

7 Claims, 2 Drawing Sheets

SLIDE RAIL DEVICE FOR VEHICLE SEAT

This application is a divisional of U.S. patent application Ser. No. 13/316,679, filed Dec. 12, 2011, which is incorporated by reference herein.

BACKGROUND OF THE INVENTION

1. Field of the Invention

The present invention relates to a slide rail device for making an adjustment to the position of a vehicle seat in the forward/rearward direction.

2. Description of Related Art

A typical slide rail device (slide rail assembly) is configured of a lower rail that is fixed to a vehicle floor, an upper rail that is fixed to a vehicle seat and engaged with the lower rail to be freely slidable thereon, and balls (steel balls) for reducing frictional resistance that are installed between the upper rail and the lower rail. The upper rail and the lower rail are each made of a metallic material (usually an iron-based material) having a uniform cross section. Such a slide rail device is disclosed in Japanese Patent Publication No. 4,230,945.

In this known slide rail device, application of a force on the upper rail and the lower rail therebetween that is produced by the weight of someone (a driver or a passenger) sitting in the vehicle seat causes relatively large forces that exert on the rails at points of contact with the balls. As a consequence, sometimes indentations are made on the rails via the balls. Since such indentations obviously deteriorate the rollability of the balls, it is desirable that the rails be formed into a shape preventing such indentations from being made on the rails as much as possible. For this reason, the radius of the balls has been set to be identical to the radius of curvature of the ball contact portions of each rail in conventional slide rail devices. Namely, if the radius of the balls is identical to the radius of curvature of the ball contact portions of each rail, the surface pressure exerted on the rails is at a geometric minimum, so that the possibility of indentations being made on the rails via the balls is low. However, the inventor of the present invention has found that, if the radius of the balls is made to be identical in design to the radius of curvature of the ball contact portions of each rail, the rollability of the balls sometimes deteriorates regardless of the presence or absence of indentations on the rails (aside from the problem of indentations), to thereby make the sliding operation of the upper rail with respect to the lower rail unstable.

SUMMARY OF THE INVENTION

As a result of having pursued the cause of the lack of stability of the sliding operation of the slide rail device, the inventor of the present invention has completed the present invention after coming to the conclusion that if the radius of the balls is made to be identical to the radius of curvature of the ball contact portion of each rail, there is a possibility of a combination of a ball and a rail being unintentionally produced in which the radius of curvature of the ball contact portion of the rail is smaller than the radius of the balls due to manufacturing error, thus causing the ball and the rail to be in contact with each other at two points to thereby deteriorate the rollability of the balls. The balls (steel balls) are extremely high in dimensional accuracy and hardness, as is known in the art, so that there is little possibility of an error in the dimensional accuracy of the balls affecting the rollability thereof. The length (angle) of the circular arc in each ball contact R-portion of the lower rail is usually greater than that of the upper rail, so that the shapes of the ball contact R-portions of the lower rail greatly affect the rollability of the balls.

According to an aspect of the present invention, a slide rail device is provided, which includes a lower rail having a uniform cross section, an upper rail having a uniform cross section which is freely slidably engaged with the lower rail, and balls which are installed between the lower rail and the upper rail. The lower rail includes a lower-rail bottom wall; a pair of lower-rail side walls which extend upward from both ends of the lower-rail bottom wall, with respect to a lateral direction, respectively; a pair of lower-rail upper walls which extend toward a center of the lower rail in the lateral direction from upper ends of the pair of lower-rail side walls, respectively; a pair of lower-rail lower-ball contact R-portions via which the pair of lower-rail side walls are connected to the lower-rail bottom wall, respectively; and a pair of lower-rail upper-ball contact R-portions via which the pair of lower-rail upper walls are connected to the pair of lower-rail side walls, respectively. The upper rail includes an upper-rail top wall; a pair of upper-rail side walls which are continuous with the upper-rail top wall and extend downward between the pair of lower-rail upper walls into the lower rail from both ends of the upper-rail top wall, with respect to a lateral direction, respectively; and a pair of upper-rail ball-bearing walls which extend outwardly upwards from lower ends of the pair of upper-rail side walls, respectively. Each of the pair of upper-rail ball-bearing walls includes an upper-rail lower-ball contact portion which is formed to face an adjacent lower-rail lower-ball contact R-portion of the pair of lower-rail lower-ball contact R-portions of the lower rail, and an upper-rail upper-ball contact portion which is formed to face an adjacent lower-rail upper-ball contact R-portion of the pair of lower-rail upper-ball contact R-portions of the lower rail. The balls include a pair of upper balls which are installed between the pair of lower-rail upper-ball contact R-portions of the lower rail and the upper-rail upper-ball contact portions of the pair of upper-rail ball-bearing walls of the upper rail, respectively; and a pair of lower balls which are installed between the pair of lower-rail lower-ball contact R-portions of the lower rail and the upper-rail lower-ball contact portions of the pair of upper-rail ball-bearing walls of the upper rail, respectively. A radius of curvature of the lower-rail lower-ball contact R-portion of the lower rail is greater than a radius of the lower ball, and a radius of curvature of the lower-rail upper-ball contact R-portion of the lower rail is greater than a radius of the upper ball.

Note that the term "R-portion" denotes a portion of the lower or upper rail which is formed into a circular arc shape with a specific curvature in cross section. This curvature can be circular or elliptical. In addition, the term "lateral" denotes a lateral direction in a vehicle widthwise direction, and the term "outward" denotes an outward direction from a cross sectional center of the rail.

Although both the upper-rail upper-ball contact portion and the upper-rail lower-ball contact portion of each of the pair of upper-rail ball-bearing walls can be formed as flat surfaces, it is desirable that at least the upper-rail upper-ball contact portion of each of the pair of upper-rail ball-bearing walls of the upper rail be formed as an upper-rail upper-ball contact R-portion that is formed into a circular arc shape with a specific curvature in cross section. This is because the ratio between the force that acts on the pair of upper-rail ball-bearing walls via the upper balls and the associated reaction force caused by deformation of the rails (the pair of upper-rail ball-bearing walls) is greater than the ratio between the force that acts on the pair of upper-rail ball-bearing walls via the lower balls and the associated reaction force caused by deformation of the rails (the pair of upper-rail ball-bearing walls), and accordingly, it is desirable that the upper-rail upper-ball contact portion of each upper-rail ball-bearing wall be formed as the aforementioned upper-rail upper-ball contact R-portion that is smaller in surface pressure than a flat surface. In addition, the radius of curvature of the upper-rail upper-ball contact R-portion is desirably set to be greater than the radius of the upper ball due to the same reason as that of the radius of curvature of the lower-rail lower-ball contact R-portion being greater than the radius of the lower ball.

It is desirable that the upper-rail lower-ball contact portion of each upper-rail ball-bearing wall of the upper rail be also formed as an upper-rail lower-ball contact R-portion (that is formed into a circular arc shape with a specific curvature in cross section) rather than a flat surface. In this case, it is desirable that the radius of curvature of the upper-rail lower-ball contact R-portion be also set to be greater than the radius of the lower ball.

It is desirable for the following conditions to be satisfied:

$R1 \geq 1.1r1$ and $R2 \geq 1.1r2$, more desirably $R1 \geq 1.2r1$ and $R2 \geq 1.2r2$, wherein r1 designates the radius of the lower ball, r2 designates the radius of the upper ball, R1 designates the radius of curvature of the lower-rail lower-ball contact R-portion, and R2 designates the radius of curvature of the lower-rail upper-ball contact R-portion. Considering dimensional errors of the rails in manufacturing, if R1 and R2 are smaller than 1.1r1 and 1.1r2, respectively, it has been confirmed that the rollability of the balls deteriorates (a combination of a ball and a rail in which the radius of curvature of the ball contact portion of the rail is smaller than the radius of the ball is unintentionally produced), though the surface pressure exerted on the rails is reduced.

On the other hand, the upper limit of the radius of curvature (R1 or R2) of each ball contact R-portion is determined so that the surface pressure at the ball contact R-portion, with which the balls are in contact, becomes equal to or smaller than an allowable surface pressure in consideration of the material of the rails.

In the slide rail device according to the present invention, it is conceivable that each of inner surfaces of the two connecting corners between the upper wall of the upper rail and the pair of upper-rail side walls of the upper rail, respectively, serves as an assumed deformation rotational center when the upper rail is resiliently deformed upon a normal load being applied thereto. In an embodiment of the slide rail device according to the present invention, each inner surface of two connecting corners between the upper-rail top wall of the upper rail and the pair of upper-rail side walls of the upper rail serves as an assumed deformation rotational center when the upper rail is resiliently deformed upon a normal load being applied thereto, and a cross sectional shape of the upper rail is determined so as to define an outward crossing angle between a line segment which connects the assumed deformation rotational center and a center of associated one of the pair of lower balls and a line segment which is tangent to both the associated one of the pair of lower balls and the upper-rail lower-ball contact R-portion at an angle in a range from 80 degrees to less than 90 degrees, desirably in the range from 80 to 88 degrees.

By setting the outward crossing angle in this manner, the pair of upper-rail side walls can be securely made to be resiliently deformable inwardly (i.e., in directions toward each other) via the lower balls. It has been confirmed that deformation of the pair of upper-rail side walls outwardly in opposite directions away from each other may deteriorate the slidability of the slide rail device.

If the aforementioned outward crossing angle is set at an angle of 90 degrees, the load carrying capacity of the upper rail 30 becomes maximum in theory. However, if the outward crossing angle is set at an angle of 90 degrees, a combination of a ball and a rail in which the outward crossing angle exceeds 90 degrees may be unintentionally produced due to manufacturing error, which may cause the pair of upper-rail side walls to be deformed outwardly in opposite directions away from each other.

According to the present invention, the radius of curvature of each ball contact R-portion of at least the lower rail is set to be greater than the radius of the associated balls, which makes it possible to obtain a slide rail device in which the indentation prevention performance and the rollability of the ball are well-balanced.

It is desirable for the lower rail to include a pair of lower-rail inner side walls which are positioned between the pair of lower-rail side walls and extend downward from inner ends of the pair of lower-rail upper walls, respectively.

It is desirable for each of the pair of upper-rail ball-bearing walls to include a vertical connecting wall via which the upper-rail lower-ball contact portion and the upper-rail upper-ball contact portion are connected.

The present disclosure relates to subject matter contained in Japanese Patent Application No. 2010-277512 (filed on Dec. 13, 2010) which is expressly incorporated herein by reference in its entirety.

BRIEF DESCRIPTION OF THE DRAWINGS

The present invention will be discussed below in detail with reference to the accompanying drawings, in which.

DESCRIPTION OF THE EMBODIMENT

Figure 1:
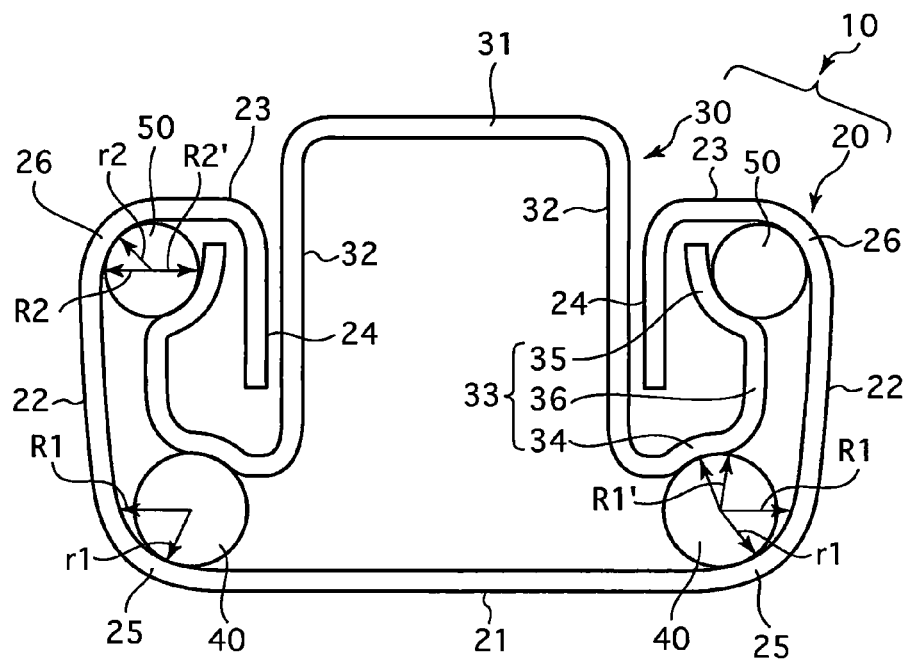
FIG. 1 is a longitudinal sectional view of an embodiment of a slide rail device according to the present invention.

FIG. 1 shows an embodiment of a slide rail device 10 according to the present invention. The slide rail device 10 is provided with a lower rail 20 and an upper rail 30 which are fixed to a vehicle floor (not shown) and a vehicle seat (not shown), respectively, and is provided between the lower rail 20 and the upper rail 30 that are engaged with each other to be relatively slidable, with two types of steel balls, i.e., lower balls 40 and upper balls 50, which are installed between the lower rail 20 and the upper rail 30. The slide rail device 10 is bilaterally symmetrical in shape in a cross section taken along a plane normal to the extension direction (lengthwise direction) of the rails 20 and 30. The lower balls 40 are greater in diameter than the upper balls 50. As known in the art, two of the slide rail devices 10 are used as a pair (left and right slide rail devices) in a state of being fixed to a vehicle, and a lock mechanism and other components are installed to this pair of slide rail devices. However, since the main concept of the present embodiment is centered around the uniform cross-sectional shapes of the lower rail 20 and the upper rail 30, only such cross sectional shapes of the lower rail 20 and the upper rail 30 will be discussed in the following descriptions. Additionally, in the following descriptions, the terms "lateral"

denote a lateral direction in a vehicle widthwise direction, respectively, the term "outward" denotes an outward direction from a cross sectional center of the lower rail 20 or the upper rail 30, and the term "R-portion" denotes a portion of the lower rail 20 or the upper rail 30 which is formed into a circular arc shape with a specific curvature in cross section.

The lower rail 20 is provided with a lower-rail bottom wall 21, a pair of lower-rail outer side walls 22, a pair of lower-rail upper walls 23 and a pair of lower-rail inner side walls 24. The horizontal lower-rail bottom wall 21 is fixed to a vehicle floor; the pair of lower-rail outer side walls 22 extend upward from both ends (sides) of the lower-rail bottom wall 21, with respect to the lateral direction, respectively; the pair of lower-rail upper walls 23 extend in the lateral direction toward the longitudinal center of the lower rail 20 from upper ends of the pair of lower-rail outer side walls 22, respectively; and the pair of lower-rail inner side walls 24 extend downward from inner ends of the pair of lower-rail upper walls 23, respectively, and are positioned between the pair of lower-rail outer side walls 22.

The lower-rail bottom wall 21 and the pair of lower-rail outer side walls 22 are connected via a pair of lower-rail lower-ball contact R-portions 25, respectively, and the pair of lower-rail outer side walls 22 and the pair of lower-rail upper walls 23 are connected via a pair of lower-rail upper-ball contact R-portions 26, respectively.

The upper rail 30 is provided with an upper-rail top wall 31, a pair of upper-rail side walls 32 and a pair of upper-rail ball-bearing walls 33. The horizontal upper-rail top wall 31 is fixed to a vehicle seat. The pair of upper-rail side walls 32 are continuous with the upper-rail top wall 31 and extend downward between the pair of lower-rail inner side walls 24 into the lower rail 20 from both ends (sides) of the upper-rail top wall 31, with respect to the lateral direction, respectively. The pair of upper-rail ball-bearing walls 33 extend outwardly upwards, toward the pair of lower-rail upper walls 23, from the lower ends of the pair of upper-rail side walls 32, respectively.

Each upper-rail ball-bearing wall 33 is provided at a lower part thereof with an upper-rail lower-ball contact R-portion 34 which is formed to face the adjacent lower-rail lower-ball contact R-portion 25 of the lower rail 20, and is provided above the upper-rail lower-ball contact R-portion 34 with an upper-rail upper-ball contact R-portion 35 which is formed to face the adjacent lower-rail upper-ball contact R-portion 26 of the lower rail 20. Each upper-rail ball-bearing wall 33 is further provided between the upper-rail lower-ball contact R-portion 34 and the upper-rail upper-ball contact R-portion 35 with a vertical connecting wall 36 via which the upper-rail lower-ball contact R-portion 34 and the upper-rail upper-ball contact R-portion 35 are connected.

The upper-rail lower-ball contact R-portion 34 and the upper-rail upper-ball contact R-portion 35 of each upper-rail ball-bearing wall 33 each have a curvature so as to hold (insert) the lower balls 40 between the upper-rail lower-ball contact R-portion 34 and the adjacent lower-rail lower-ball contact R-portion 25 and to hold (insert) the upper balls 50 between the upper-rail upper-ball contact R-portion 35 and the adjacent lower-rail upper-ball contact R-portion 26. However, the upper-rail lower-ball contact R-portion 34 and the upper-rail upper-ball contact R-portion 35 of each upper-rail ball-bearing wall 33 are smaller in area (angle) at which a curvature is formed than the adjacent lower-rail lower-ball contact R-portion 25 and the adjacent lower-rail upper-ball contact R-portion 26, respectively. Each adjacent lower-rail lower-ball contact R-portion 25 and each adjacent lower-rail upper-ball contact R-portion 26 are formed to extend by an angle of 90 degrees, whereas the curved area (angle) of the upper-rail lower-ball contact R-portion 34 of each upper-rail ball-bearing wall 33 in particular is small (can be reduced), thus capable of being replaced by a flat surface (flat surface area).

The radius of curvature R1 of the lower-rail lower-ball contact R-portions 25 and the radius of curvature R1' of the upper-rail lower-ball contact R-portions 34 are each defined greater than the radius r1 of the lower balls 40. Likewise, the radius of curvature R2 of the lower-rail upper-ball contact R-portions 26 and the radius of curvature R2' of the upper-rail upper-ball contact R-portions 35 are each defined greater than the radius r2 of the upper balls 50. The radius of curvature R1 and the radius of curvature R1' can be mutually identical or slightly different from each other. Likewise, the radius of curvature R2 and the radius of curvature R2' can be mutually identical or slightly different from each other.

Figure 3:
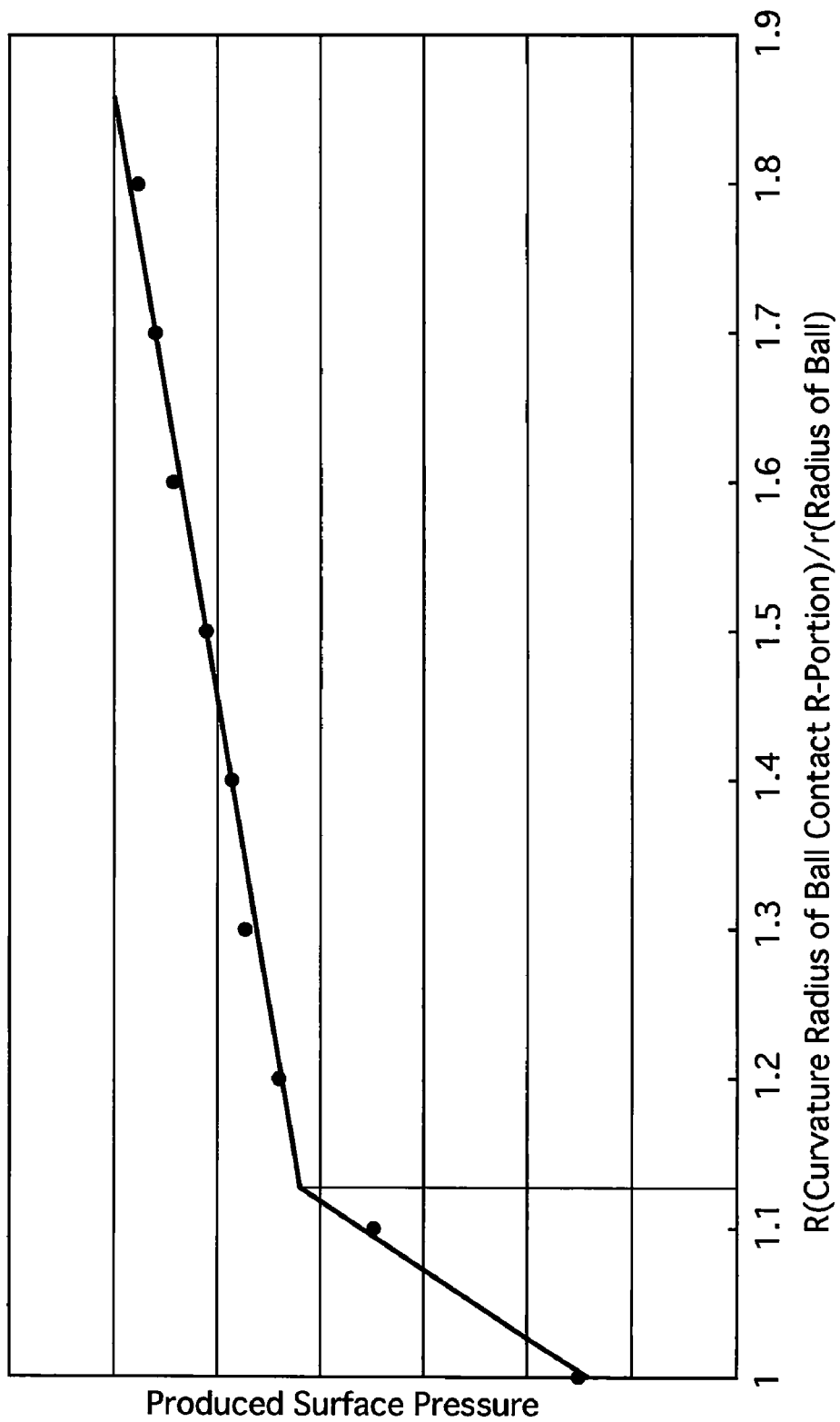
FIG. 3 is a graph showing experimental data on the relationship between the contact-surface pressure and the radius of curvature (R) of a ball contact R-portion divided by the radius (r) of the ball.

FIG. 3 is a graph showing experimental data indicating variations of the contact-surface pressure at a ball contact R-portion (25, 26, 34 or 35) when the ratio between the radius r (r1 or r2) of the lower balls 40 or the upper balls 50 and the radius of curvature R (R1, R2, R1' or R2') of the ball contact R-portion (25, 26, 34 or 35) is changed. As can be understood from the graph of FIG. 3, a boundary at which the contact-surface pressure drastically changes exists (is defined) between a point where the value R/r (the radius of curvature R divided by the radius r) is equal to 1.1 and a point where the value R/r is equal to 1.2. Considering this fact and variations in radius of curvature of the ball contact R-portions of the lower rail 20 and the upper rail 30 due to manufacturing error, reliable rollability of the lower balls 40 and the upper balls 50 can be ensured regardless of variations in radius of curvature R of the ball contact R-portion 25, 26, 34 or 35, by setting the radius of curvature R so as to be equal to or greater than approximately 1.1 times of the radius r (i.e., $R \geq 1.1r$); more desirably equal to or greater than approximately 1.2 times of the radius r (i.e., $R \geq 1.2r$). On the other hand, the upper limit of the radius of curvature R (R1 and R2) of each ball contact R-portion (25 and 26) is set so that the surface pressure at the ball contact R-portion, with which the balls (40 or 50) are in contact, becomes equal to or smaller than an allowable surface pressure in consideration of the material of the rails.

In addition to each lower-rail lower-ball contact R-portion 25 and each lower-rail upper-ball contact R-portion 26, each upper-rail lower-ball contact R-portion 34 and each upper-rail upper-ball contact R-portion 35 are also each formed as an R-portion in the above illustrated embodiment; however, each upper-rail lower-ball contact R-portion 34 in particular among each upper-rail lower-ball contact R-portion 34 and each upper-rail upper-ball contact R-portion 35 can be made as a flat portion. On the other hand, it is desirable that each upper-rail upper-ball contact R-portion 35 be formed as an R-portion which is smaller in surface pressure than a flat surface like the above described embodiment because each upper-rail upper-ball contact R-portion 35 plays a role in providing flexibility to the associated upper-rail ball-bearing wall 33 via the associated lower ball 40.

Figure 2:
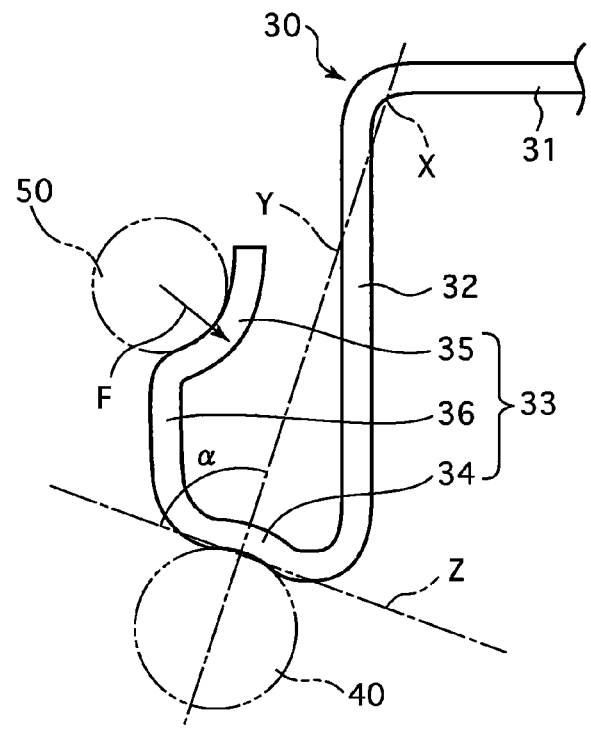
FIG. 2 is a sectional view of part of the upper rail shown in FIG. 1, showing the detailed shape thereof.

FIG. 2 is a diagram for illustrating a desirable shape of the upper rail 30 in its free state. In each of left and right halves of the upper rail 30 (only a left half of the upper rail 30 is shown in FIG. 2), an inner surface of the connecting corner between the upper wall 31 and the upper-rail side wall 32 becomes an assumed deformation rotational center X when the upper rail 30 is resiliently deformed upon a normal load being applied thereto. The cross sectional shape of the upper rail 30 in its free state is determined so as to define an outward crossing angle α between a line segment Y, which connects the assumed deformation rotational center X and the center of the associated lower ball 40, and a line segment Z which is tangent to both the associated lower ball 40 and the upper-rail lower-ball contact R-portion 34, at an angle in the range from 80 degrees to less than 90 degrees, more desirably in the range from 80 to 88 degrees. By setting the outward crossing angle α in this manner, the pair of upper-rail side walls 32 can be securely made to be resiliently deformable inwardly (i.e., in directions toward each other) via the lower balls 40. Conversely, deformation of the pair of upper-rail side walls 32 outwardly in opposite directions away from each other may deteriorate the slidability of the slide rail device 10.

In other words, the load carrying capacity of the upper rail 30 becomes maximum in theory when the line segment Y and the line segment Z intersect each other at right angles (at an angle of 90 degrees). However, if the upper rail 30 is designed so that the line segment Y and the line segment Z intersect each other at right angles, the outward crossing angle α may become greater than 90 degrees when the shape of the upper rail 30 varies due to manufacturing error, and consequently, the pair of upper-rail side walls 32 become easy to deform outwardly, thus having an adverse effect on the slidability of the slide rail device 10. In the present embodiment of the slide rail device 10, the shape of the slide rail device 10 is defined so that the outward crossing angle α is always less than 90 degrees even with the presence of manufacturing error. This definition of the shape of the upper rail 30 in its free state is independent from the aforementioned features of the radius of curvature R1 of the lower-rail lower-ball contact R-portions 25 and the radius of curvature R1' of the upper-rail lower-ball contact R-portions 34 (being each defined greater than the radius r1 of the lower balls 40) and of the radius of curvature R2 of the lower-rail upper-ball contact R-portions 26 and the radius of curvature R2' of the upper-rail upper-ball contact R-portions 35 (being each defined greater than the radius r2 of the upper balls 50).

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A slide rail device which includes a lower rail having a uniform cross section, an upper rail having a uniform cross section which is freely slidably engaged with said lower rail, and balls which are installed between said lower rail and said upper rail, wherein said balls comprise upper balls and lower balls, wherein said lower balls are inserted between a pair of lower-rail lower-ball contact R-portions formed on said lower-rail and a pair of upper-rail lower-ball contact portions formed on said upper rail, and wherein said upper balls are inserted between a pair of lower-rail upper-ball contact R-portions via formed on said lower-rail and a pair of upper-rail upper-ball contact portions formed on said upper rail, and wherein the following conditions are satisfied:

$R1 \geq 1.1 r1$, and $R2 \geq 1.1 r2$, wherein r1 designates said radius of said lower ball, r2 designates said radius of said upper ball, R1 designates said radius of curvature of said lower-rail lower-ball contact R-portion, and R2 designates said radius of curvature of said lower-rail upper-ball contact R-portion, and wherein said lower rail comprises:

a lower-rail bottom wall;

a pair of lower-rail side walls which extend upward from laterally opposite sides of said lower-rail bottom wall, respectively; and a pair of lower-rail upper walls which extend toward a center of said lower rail in the lateral direction from upper ends of said pair of lower-rail side walls, respectively;

wherein said pair of lower-rail lower-ball contact R-portions connect said pair of lower-rail side walls to said lower-rail bottom wall, respectively; and wherein said pair of lower-rail upper-ball contact R-portions connect said pair of lower-rail upper walls to said pair of lower-rail side walls, respectively.

2. The slide rail device of claim 1, wherein, out of said upper-rail lower-ball contact portion and said upper-rail upper-ball contact portion of said upper-rail, at least said upper-rail upper-ball contact portion is formed as an upper-rail upper-ball contact R-portion that is formed into a circular arc shape with a specific curvature in cross section, wherein the following condition is satisfied:

$R2' \geq 1.1 r2$, wherein r2 designates said radius of said upper ball, and R2' designates said radius of curvature of said upper-rail upper-ball contact R-portion.

3. The slide rail device of claim 2 wherein said radius of curvature (R2) of said lower-rail upper-ball contact R-portion and said radius of curvature (R2') of said upper-rail upper-ball contact R-portion are different from each other.

4. The slide rail device of claim 1, wherein said upper-rail lower-ball contact portion of said upper rail is formed as an upper-rail lower-ball contact R-portion that is formed into a circular arc shape with a specific curvature in cross section, and the following condition is satisfied:

$R1' \geq 1.1 r1$, wherein r1 designates said radius of said lower ball, and R1' designates said radius of curvature of said upper-rail lower-ball contact R-portion.

5. The slide rail device of claim 4 wherein said radius of curvature (R1) of said lower-rail lower-ball contact R-portion and said radius of curvature (R1') of said upper-rail lower-ball contact R-portion are different from each other.

6. The slide rail device of claim 1, wherein said upper rail comprises:

an upper-rail top wall;

a pair of upper-rail side walls which extend downward between said pair of lower-rail upper walls into said lower rail, respectively; and a pair of upper-rail ball-bearing walls which extend outwardly upwards from lower ends of said pair of upper-rail side walls, respectively, wherein said upper-rail ball-bearing wall includes said upper-rail lower-ball contact portion, which is formed to face an adjacent said lower-rail lower-ball contact R-portion of said lower rail, and said upper-rail upper-ball contact portion, which is formed to face an adjacent said lower-rail upper-ball contact R-portion of said lower rail.

7. The slide rail device of claim 1 wherein the lower-rail bottom wall (21) is flat until the respective ball contacting portions.

\* \* \* \* \*